(No Model.) 7 Sheets—Sheet 1.
W. W. SHAILER & H. P. CHAPMAN.
AUTOMATIC MACHINE FOR PRODUCING PIANO ACTION PARTS.
No. 567,796. Patented Sept. 15, 1896.
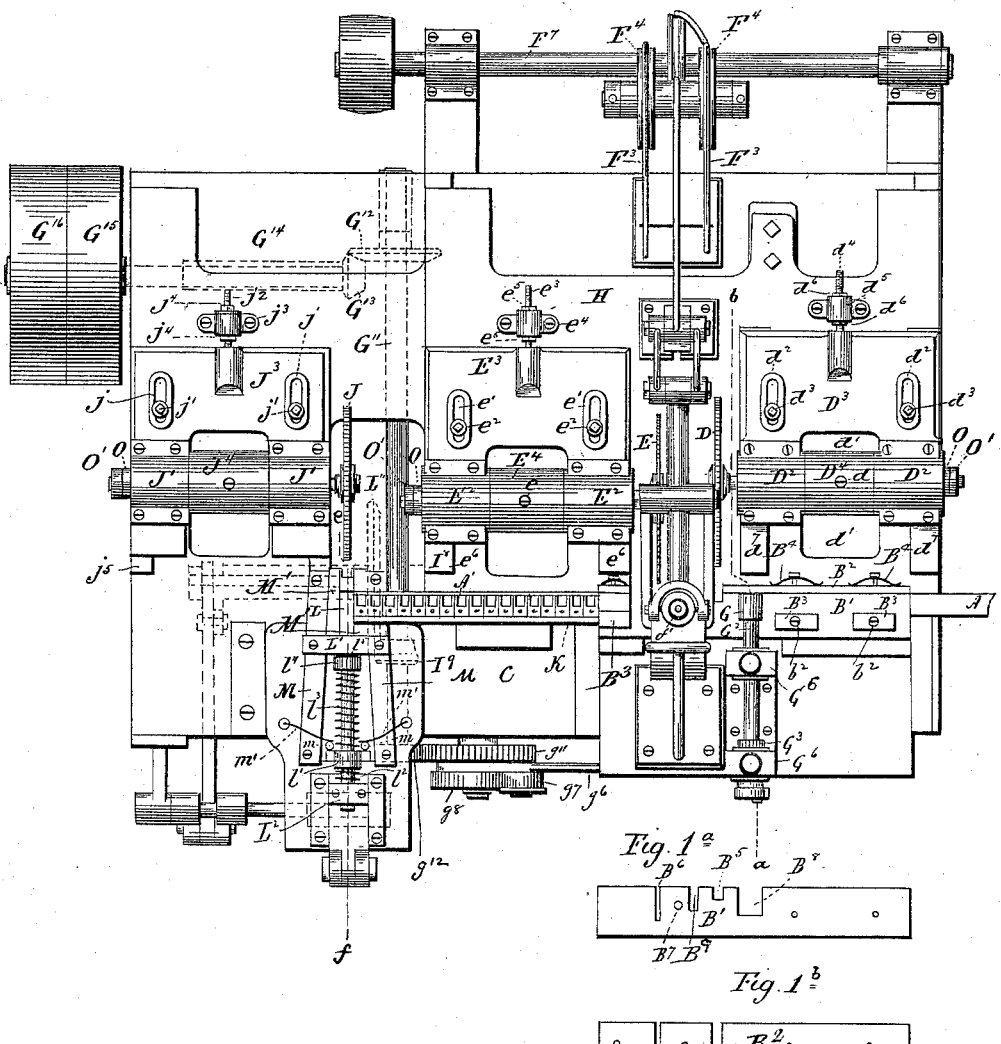

(No Model.) 7 Sheets—Sheet 2.
W. W. SHAILER & H. P. CHAPMAN.
AUTOMATIC MACHINE FOR PRODUCING PIANO ACTION PARTS.
No. 567,796. Patented Sept. 15, 1896.
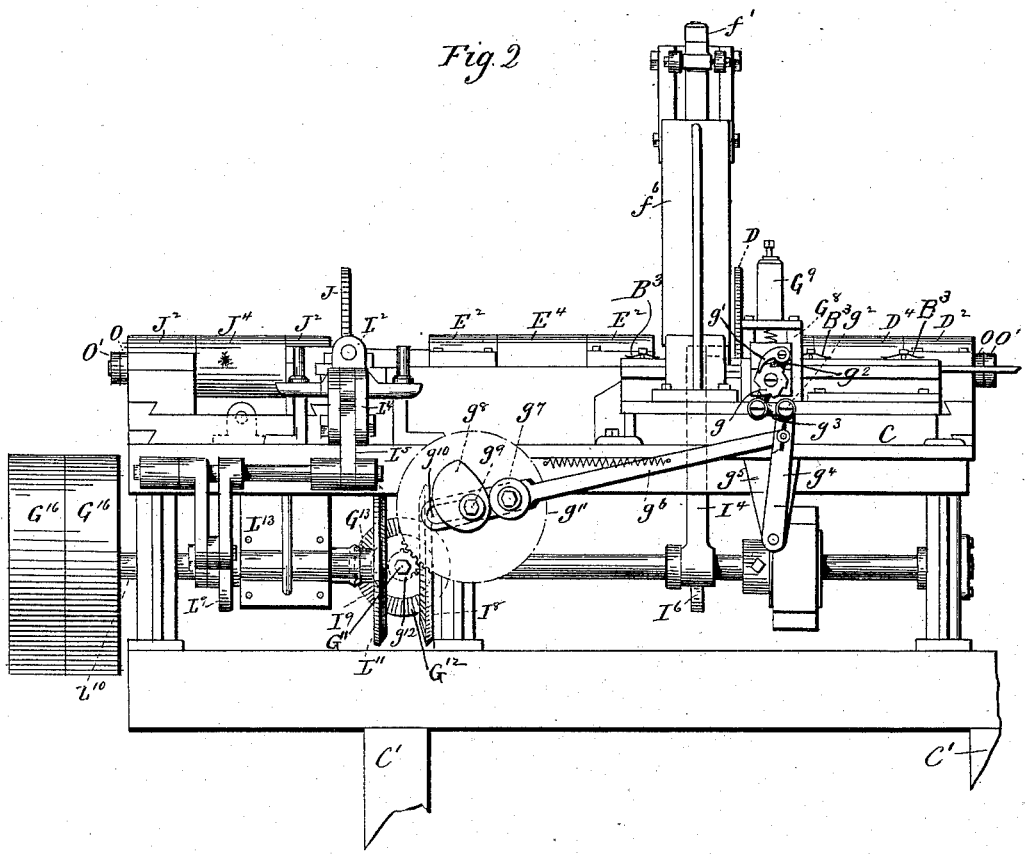
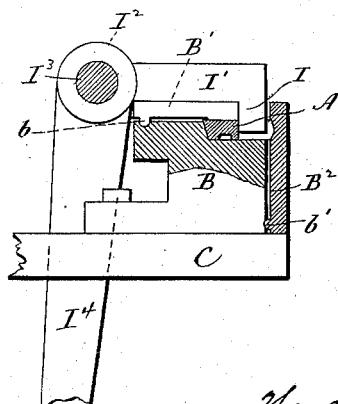

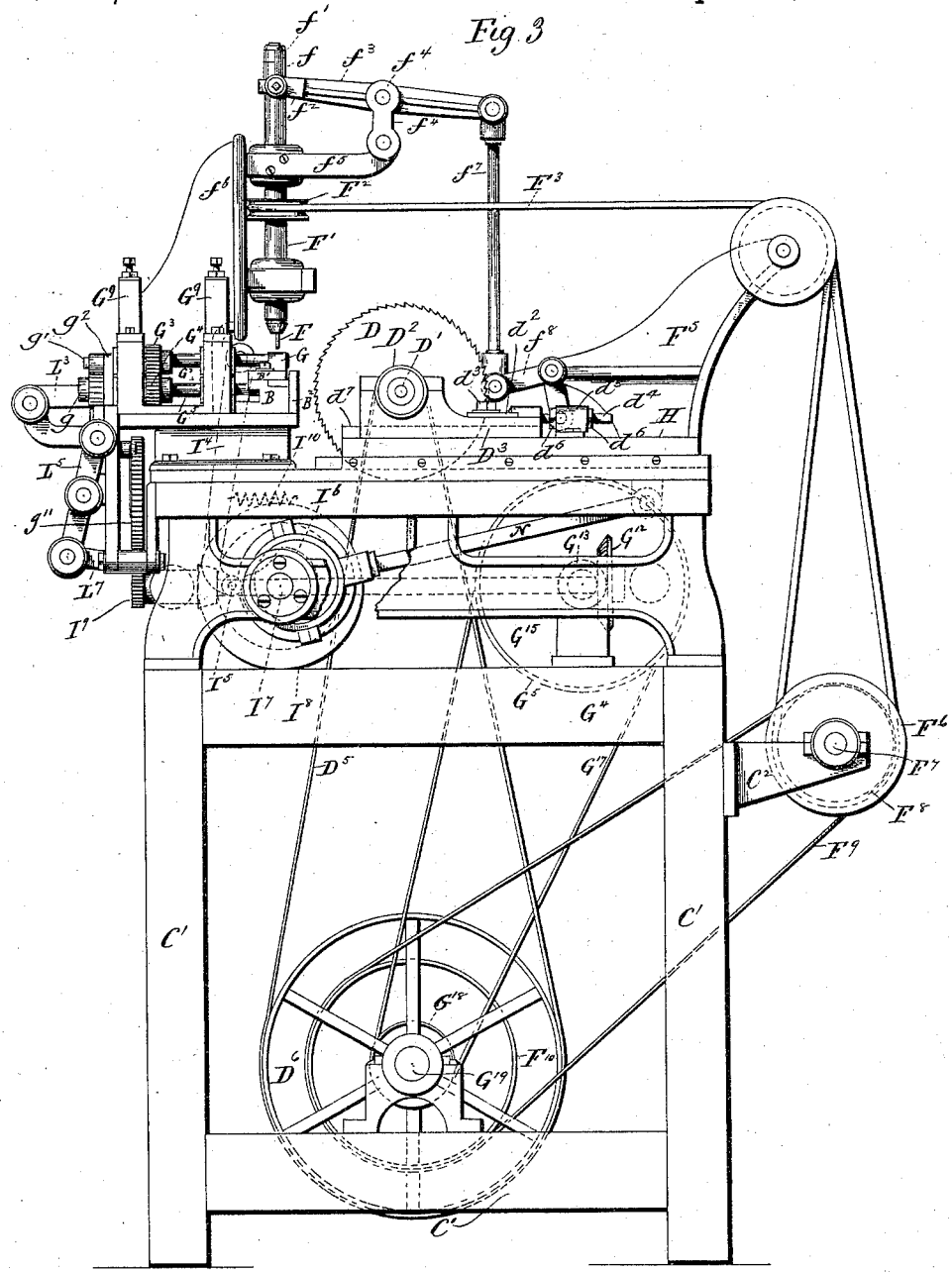

(No Model.) 7 Sheets—Sheet 4.
W. W. SHAILER & H. P. CHAPMAN.
AUTOMATIC MACHINE FOR PRODUCING PIANO ACTION PARTS.
No. 567,796. Patented Sept. 15, 1896.
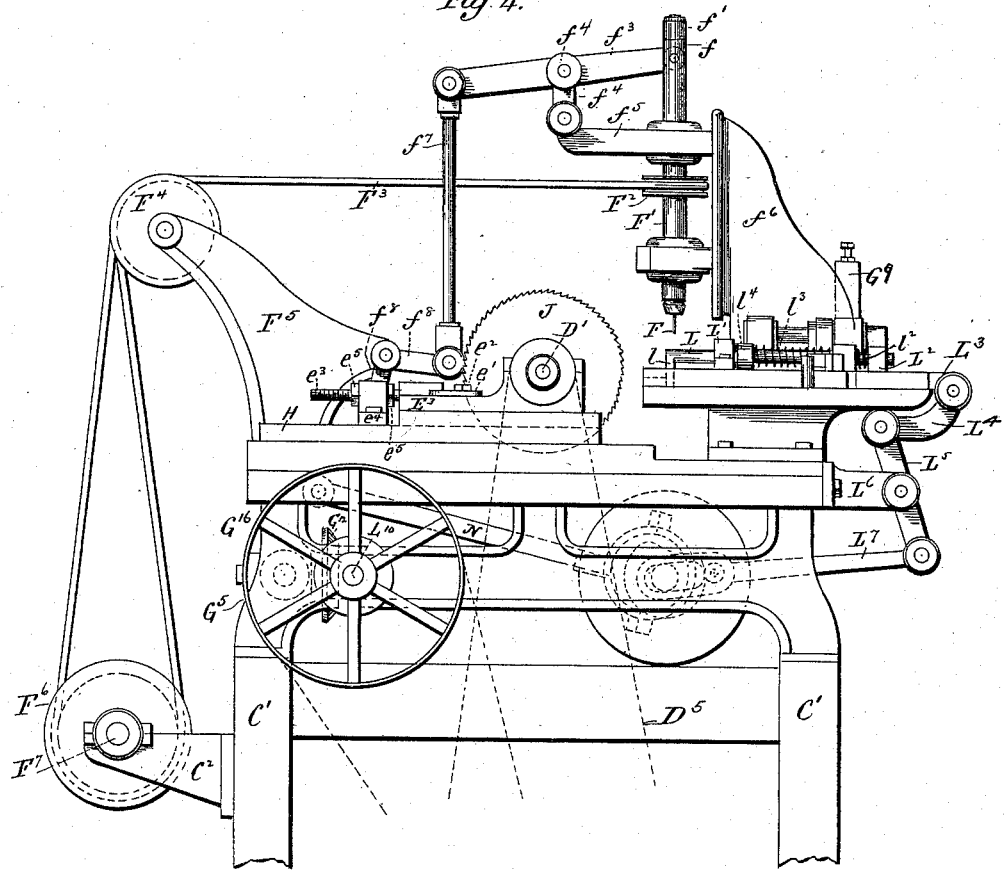

(No Model.) 7 Sheets—Sheet 5.
W. W. SHAILER & H. P. CHAPMAN.
AUTOMATIC MACHINE FOR PRODUCING PIANO ACTION PARTS.
No. 567,796. Patented Sept. 15, 1896.
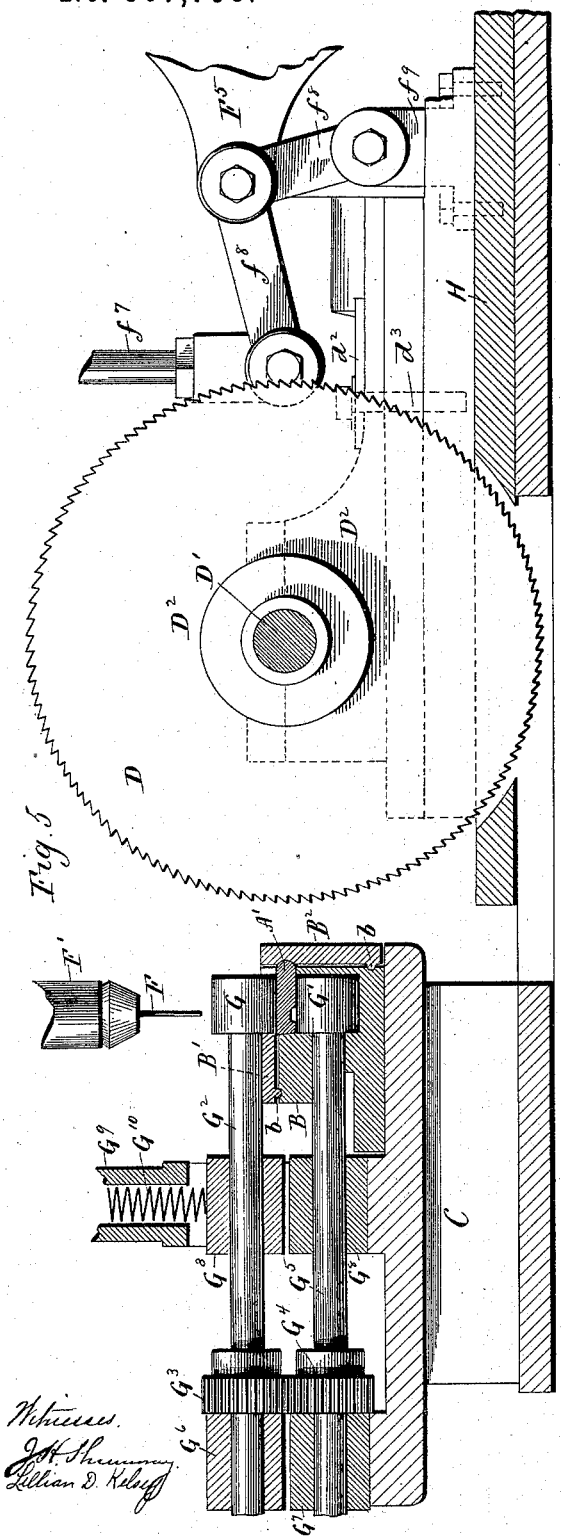
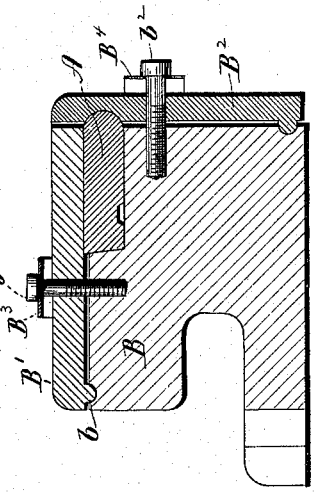

(No Model.) 7 Sheets—Sheet 6.
W. W. SHAILER & H. P. CHAPMAN.
AUTOMATIC MACHINE FOR PRODUCING PIANO ACTION PARTS.
No. 567,796. Patented Sept. 15, 1896.
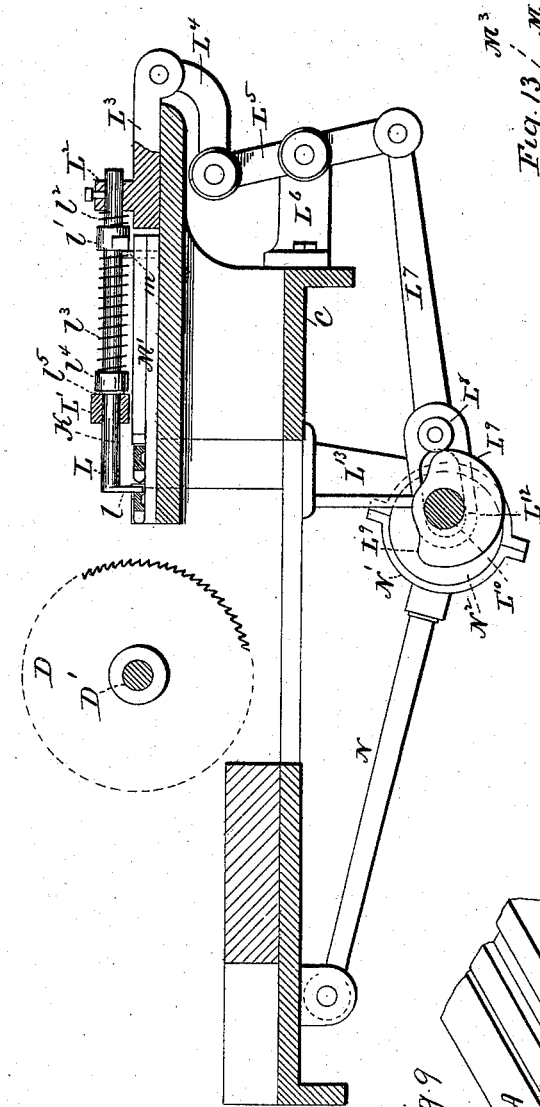
Witnesses.
J. H. Shumway.
Lillian D. Kelsey.
William W. Shailer
Harry P. Chapman
Inventors
By attys
Earle Seymour (No Model.) 7 Sheets—Sheet 7.

W. W. SHAILER & H. P. CHAPMAN.
AUTOMATIC MACHINE FOR PRODUCING PIANO ACTION PARTS.

No. 567,796. Patented Sept. 15, 1896.

UNITED STATES PATENT OFFICE.

WILLIAM W. SHAILER AND HENRY P. CHAPMAN, OF IVORYTON, CONNECTICUT, ASSIGNORS TO THE COMSTOCK CHENEY & COMPANY, OF SAME PLACE.

AUTOMATIC MACHINE FOR PRODUCING PIANO-ACTION PARTS.

SPECIFICATION forming part of Letters Patent No. 567,796, dated September 15, 1896.

Application filed June 25, 1894. Serial No. 515,615. (No model.)

*To all whom it may concern:*

Be it known that we, WILLIAM W. SHAILER and HENRY P. CHAPMAN, of Ivoryton, in the county of Middlesex and State of Connecticut, have invented a new Improvement in Automatic Machines for Producing Piano-Action Parts; and we do hereby declare the following, when taken in connection with the accompanying drawings and the letters of reference marked thereon, to be a full, clear, and exact description of the same, and which said drawings constitute part of this specification, and represent, in—

Figure 11:
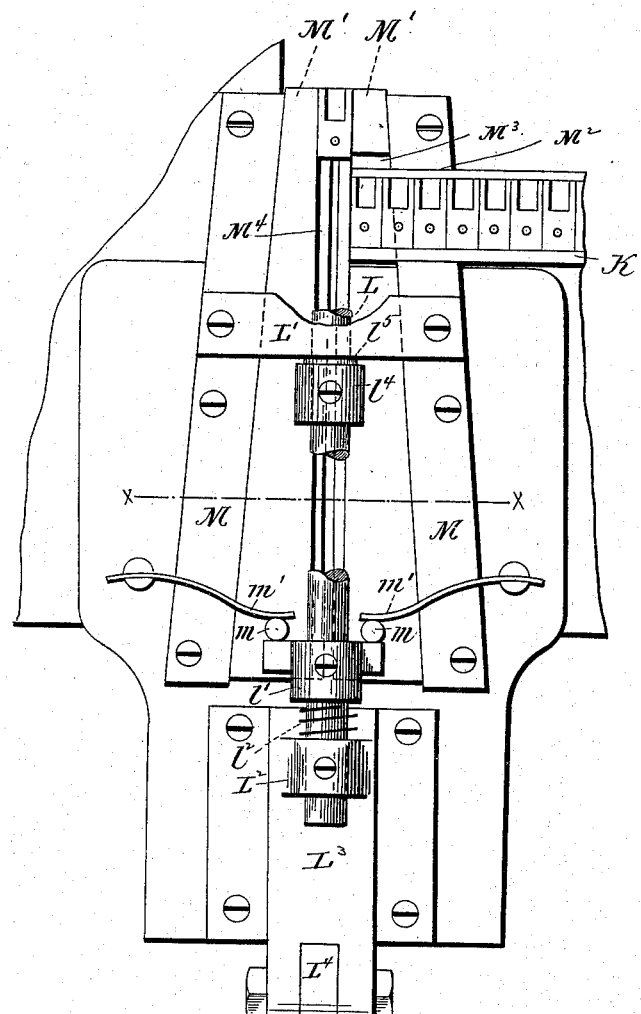
Figure 12:
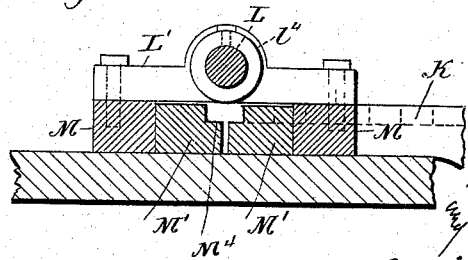

Figure 1, a plan view of one form which a machine constructed in accordance with our invention may assume; Fig. 1ª, a detached plan view of the top vise-plate; Fig. 1ᵇ, a corresponding view of the side vise-plate; Fig. 2, a view of the machine in front elevation; Fig. 3, a view of the machine in end elevation from the feed end thereof; Fig. 4, a corresponding view from the discharge end of the machine; Fig. 5, a view of the machine in vertical section on the line $a\ b$ of Fig. 1; Fig. 6, an enlarged sectional view of the vise body and plates; Fig. 7, a view in transverse section on the line $e\ f$ of Fig. 1; Fig. 8, a detached sectional view showing the stop-gage; Fig. 9, a broken perspective view of such a stock-strip as will be employed in the production of piano-action flanges; Fig. 10, a perspective view of a piano-action flange produced in our improved machine; Fig. 11, an enlarged broken plan view of the finishing mechanism; Fig. 12, a sectional view thereof on the line $x\ x$ of Fig. 11; Fig. 13, a broken perspective view showing the jaws, the jaw-guides, and the flange-guide which delivers the flanges to the jaws.

Our invention relates to an improvement in automatic machines for producing piano-action parts, such as flanges, butts, jacks, levers, tongues, &c., the object being to produce a machine having a large capacity for accurate work, reducing the handling of the stock to the minimum, and adapted to have its saws or rotary cutters independently adjusted and set to compensate for their wear and for the wear of their bearings to accommodate cutters varying in diameter and to provide for the production of parts of various widths.

With these ends in view our invention consists in an automatic machine having certain details of construction and combinations of parts, as will be hereinafter described, and pointed out in the claims.

As herein shown, the machine is constructed with particular reference to the production of piano-action flanges, although it may easily be adapted to the automatic production of other piano-action parts, as stated above.

It will be understood that the material from which the flanges are produced by our improved machine is formed in long strips, which we shall hereinafter term "stock-strips," in a machine suitable for the purpose and commonly known as a "molding" or "sticking" machine.

For convenience of description we shall describe the several instrumentalities of our improved machine in the order of succession in which they operate upon a stock-strip A, such as shown by Fig. 9, to produce the flange A'. (Shown by Fig. 10.)

The stock-strip A is fed into a vise comprising a long narrow-chambered body B, a long narrow top or horizontal vise-plate B', and a corresponding vertical or side vise-plate B², the body of the vise being bolted to the bed C of the machine, as shown, for instance, in Fig. 8 of the drawings.

The plates B' and B² referred to constitute in fact the jaws of the vise, but, inasmuch as they are in the form of plates, we shall refer to them as "vise-plates" rather than "vise-jaws." The outer edge of the top vise-plate B' is constructed with a depending rib $b$, which takes into a corresponding groove formed in the top of the body B, whereby the said vise-plate is pivotally connected, as it were, with the said body. The lower end of the side vise-plate B² is constructed with an inwardly-projecting corresponding rib $b$, which takes into a groove formed in the inner face of the vise-body, whereby the said side vise-plate is also pivotally connected therewith. The top vise-plate B' is yieldingly held down upon the stock-strip A by means of three corresponding compression-springs B³, located upon its upper face and held in place by tension-screws $b^2$, entering the vise-body, while the side vise-plate $B^2$ is yieldingly held in place against the rounded inner edge of the stock-strip A by three corresponding compression-springs $B^4$, held in place by tension-screws $b^5$, also entering the body.

As shown in Fig. 1$^a$ of the drawings, the top vise-plate $B'$ has two transverse clearance-slots $B^5$ and $B^6$, entering it from its inner edge, the former to receive the grubbing saw or cutter D and the latter to receive the slitting saw or cutter E. It is also formed with a perforation $B^7$ to permit the drill F to pass downward through the stock-strip A. As herein shown, this top vise-plate is made in one piece, but if found more convenient it may be made in three pieces. The side vise-plate, a detached view of which is shown in Fig. 1$^b$, is necessarily made in three sections for the passage of the grubbing-saw D and the slitting-saw E, just before referred to, but for convenience we have chosen to speak of this plate as though made in one piece.

The stock-strip is fed forward through the vise by means of two friction feed-rolls G and G', the former passing downward through an opening $B^8$, formed to receive it in the top vise-plate $B'$, and the latter being located in a chamber or recess formed to receive it in the vise-body B. The upper friction-roll G is secured to the inner end of a horizontally-arranged shaft $G^2$, the outer end of which carries a pinion $G^3$, meshing into a corresponding pinion $G^4$, located at the outer end of a parallel shaft $G^5$, the inner end of which carries the lower friction-roll G'. The bearings $G^6$ of the upper shaft $G^2$ and the bearings $G^7$ of the lower shaft $G^5$ are movably mounted in small pillow-blocks $G^8$, the caps $G^9$ of which are extended upward and recessed to receive tension-springs $G^{10}$, which bear upon the bearings $G^6$ of the shaft $G^2$ of the upper friction-roll G, so as to hold the same yieldingly down upon the upper face of the stock-strip A. This construction provides for any inequalities in the thickness of the stock-strip and also insures a yielding and easy feeding of the same.

The lower shaft $G^5$ is provided at its outer end with a ratchet-wheel $g$, engaged for actuating the shaft by means of a pawl $g'$, hung upon the upper end of a pawl-plate $g^2$, which is pivotally hung upon the projecting outer end of the said shaft, between the said ratchet-wheel and the outer face of the bearing $G^7$ of the shaft. The lower end of the said plate is connected by a short link $g^3$ with the upper end of a vertically-arranged rocking lever $g^4$, hung by its lower end to a bracket $g^5$, depending from the bed C of the machine. The said rocking lever has connected with it, midway of its ends, an operating-rod $g^6$, the opposite end of which is provided with an antifriction-roll $g^7$, engaged for operating the rod by means of a cam $g^8$, mounted on a stud-shaft $g^9$, which passes through an elongated slot $g^{10}$, formed in the enlarged inner end of the rod $g^6$. The said stud-shaft $g^9$ is also provided with a spur-gear $g^{11}$, meshing into a pinion $g^{12}$, carried by the forward end of the horizontally-arranged shaft $G^{11}$, the rear end of which extends through to the back of the machine, where it is furnished with a bevel-gear $G^{12}$, meshing into a bevel-pinion $G^{13}$, mounted on the inner end of the secondary driving-shaft $G^{14}$, the outer end of which carries a fixed pulley $G^{15}$ and a loose pulley $G^{16}$, over which passes a belt $G^{17}$, also running over a smaller pulley $G^{18}$, mounted on the main driving-shaft $G^{19}$, which is arranged horizontally in the lower portion of the frame C' of the machine. We may here add that the mechanism shown for driving the friction feed-rolls may take other forms, all of which are comprehended by our invention.

The first operation performed upon the stock-strip A, after it begins to feed, is the formation in its inner edge of a wide slot or throat $a$ by the grubbing-saw D, which is removably secured to the inner end of a horizontally-arranged arbor D', journaled in bearings $D^2 D^2$, located in line upon the inner end of a slide $D^3$, which is adjustable forward and back upon a large movable table or tool-carriage H, which will be described later on. A pulley $D^4$, located between the bearings $D^2 D^2$, is secured to the arbor D' by means of a set-screw $d$. A belt $D^5$, running over this pulley, also passes over a large pulley $D^6$, mounted upon the main driving-shaft $G^{19}$, as shown in Fig. 3 of the drawings. The adjustable slide $D^3$ is cut away, as at $d'$ $d'$, on opposite sides of the pulley $D^4$, so as to clear the said belt $D^5$. The said slide $D^3$ is also constructed with two elongated slots $d^2$ $d^2$, arranged parallel with each other, and receiving-bolts $d^3$ $d^3$, by which the slide is secured to the movable table, upon which the slide may be adjusted within the limits of the lengths of the slots. For adjusting the slide back and forth it is provided at its rear end with an adjusting-screw $d^4$, passing through a small block $d^5$, permanently secured to the table H, and having a horizontal opening somewhat larger in diameter than the diameter of the said screw. Check-nuts $d^6 d^6$, mounted on the screw and located on opposite sides of the block, are provided for fixing the extension of the screw through the same. Guides $d^7 d^7$, secured to the movable table H, coact with the slide $D^3$ for guiding the same during adjustment and preventing the same from swerving laterally. It will be understood that by means of this construction we are enabled to move the slide carrying the grubbing-saw back and forth, so as to compensate for the wear of this saw or to accommodate saws of different diameters, and this independently of any other part of the machine. The particular devices for securing the slide to the table and for adjusting it thereupon might of course be varied.

The intermittent inward movement of the stock-strip A is controlled by means of a stop-gage, which successively enters the throats or wide slots formed in the strip by the action of the grubbing-saw. This gage comprises a finger I, adapted to enter the slots or throats formed by the grubbing-saw and projecting downward from the inner end of an arm I', which extends over the top vise-plate B', the said arm terminating at its outer end in a hub $I^2$, receiving a pivot bolt or pin $I^3$, and provided with a depending operating-arm $I^4$, carrying in its lower end an antifriction-roller $I^5$, which rides upon a cam $I^6$, mounted upon a shaft $I^7$, provided with a large plate-gear $I^8$, meshing into a bevel-pinion $I^9$, located about midway of the length of the shaft $G^{11}$, before mentioned. A spring $I^{10}$, connected with the lower end of the lever $I^4$, exerts a constant effort to draw the same inward and hold its antifriction-roller $I^5$ upon the edge of the cam $I^6$. The parts just described are constructed and arranged so that there will be one operation of the stop-gage for every operation of the grubbing-saw, the finger I of the gage lifting out of the stock-strip to permit the same to be fed inward under it and descending when the strip is fed into the slot last formed therein. To permit the finger I of the stop-gage to enter the slots or throats formed in the stock-strip in the performance of its stop function, the upper vise-plate has a slot $B^9$ formed in it, as shown in Fig. 1$^a$, this slot being located between the slot $B^5$ and the drill-opening $B^7$, which latter is located between the slot $B^9$ and the slitting-saw slot $B^6$.

The next operation upon the strip is that of drilling for forming in the flanges the small holes $a'$, which receive the screws to fasten the flanges on the action-rail. For the purpose of drilling the strip we provide the drill F with a vertically-movable drill-spindle F', carrying a small pulley $F^2$, over which passes a round belt $F^3$, passing over two idle-pulleys $F^4$ $F^4$, mounted in the upper rear end of a bracket $F^5$, secured to the bed C of the machine. The belt passes thence downward over a pulley $F^6$, mounted on a shaft $F^7$, running in bearings supported by a bracket $C^2$, extending rearward from the frame of the machine. The said shaft $F^7$ also carries a driven pulley $F^8$, over which passes a belt $F^9$, passing also over a driving-pulley $F^{10}$, mounted on the main driving-shaft $G^{19}$, as shown in Fig. 3. At its upper end the spindle is furnished with a sleeve $f$, confined in place by a collar $f'$, and having attached to it a yoke $f^2$, located at the forward end of a rocking lever $f^3$, pivoted in the upper end of a toggle-link $f^4$, the lower end of which is pivotally connected with the inner end of an arm $f^5$, extending rearward from the inner face of a bracket $f^6$, which is fastened at its lower end to the forward edge of the bed C of the machine. The inner end of the rocking lever $f^3$ is connected with the upper end of a connection-rod $f^7$, the lower end of which is adjustably and pivotally connected with one arm of a bell-crank lever $f^8$, pivotally and adjustably connected with the forward portion of the bracket $F^5$, before mentioned, the other arm of the said bell-crank lever $f^8$ being pivotally connected with a block $f^9$, secured to the movable table H, which, as it is moved back and forth, operates through the bell-crank lever $f^8$, the connection-rod $f^7$, the rocking lever $f^3$, and the sleeve $f$, to vertically reciprocate the spindle carrying the drill.

It is apparent that provision must be made for a little lost motion between the table H and the bell-crank lever $f^8$.

Obviously other means than those shown might be employed for operating the drill in harmony with the other instrumentalities of the machine.

The next operation performed upon the stock-strip is the cutting of it into short lengths, each of which contains a wide slot or throat and a drill-hole and forms one of the flanges A'. For the purpose of cutting the strip up or slitting it, as described, we employ a slitting-saw E, which is removably attached to one end of an arbor E', journaled in boxes $E^2$ $E^2$, located in line with each other upon the outer edge of a slide $E^3$, mounted upon the movable table H and adjustable thereupon independently of the slide $D^3$, which carries the grubbing-saw D. Between the bearings $E^2$ $E^2$ the arbor E' carries a pulley $E^4$, fastened to it by means of a set-screw $e$. The said pulley $E^4$ is driven in exactly the same manner as the pulley $D^4$, by means of a belt, which is not shown, but which corresponds to the belt $D^5$, and by means of a large pulley, which is not shown, but which corresponds to the pulley $D^6$. The slide $E^3$ is constructed with two elongated slots $e'$ $e'$, receiving bolts $e^2$ $e^2$, which secure it to the movable table H, upon which the slide is adjustable within the limits of the lengths of the slots. The adjustment of the said slide $E^3$ upon the table is effected by means of a screw $e^3$, passing through a block $e^4$, permanently attached to the movable table H. Check-nuts $e^5$ $e^5$, mounted upon the screw, impinge against the opposite faces of the block and control the extension of the screw through the same, and hence the position of the slide upon the movable table. Guides $e^6$ $e^6$, secured to the table, coact with the slide $E^3$ for guiding the same and preventing it from swerving laterally. It will be observed that the adaptation of the slide $E^3$, to be secured to the movable table, and the provision for adjusting the position of the slide upon the said table, correspond to the adaptation and provision of the slide $D^3$, which carries the grubbing-saw D, for being secured to and adjusted upon the table.

We have thus provided for grubbing or slotting and boring the stock-strip, and also for slitting it into sections, each of which forms a piano-action flange. These flanges may now be used, if desired, but preferably we subject them to a finishing operation in the same machine by the provision of the same with a saw J, which we call the "finishing" grubbing-saw. With this end in view we provide the machine with a horizontal guideway K, Figs. 1, 7, 11, 12, and 13, located in line with the vise and impinging against the inner end thereof, so as to receive the flanges as they emerge from between the inner ends of the top and side vise-plates. The said guideway is secured directly to the bed C of the machine, as shown in Fig. 1, and at its rear end delivers the flanges in front of a feed-plunger L, provided at its extreme inner end with a depending finger $l$, which engages with the flanges to move them forward. The said plunger is supported at its forward end in a bridge L', the ends of which are secured to the upper faces of two jaw-guides M M, to be described hereinafter.

At its outer end the plunger is supported in a block $L^2$, formed integral with or connected to a slide $L^3$, the outer end of which is pivotally connected with a rock-arm $L^4$, attached to the upper end of a rocking lever $L^5$, hung upon a bracket $L^6$, secured to the bed C of the machine, the lower end of the said rocking lever $L^5$ being connected with a connection-rod $L^7$, the inner end of which is furnished with an antifriction-roller $L^8$, which engages with a cam $L^9$, mounted upon a shaft $L^{10}$, carrying a plate-gear $L^{11}$, Fig. 1, which meshes into the bevel-pinion $I^5$, mounted upon the shaft $G^{11}$, before referred to. The shaft $L^{10}$ passes through an elongated slot $L^{12}$, formed in the enlarged inner end of the connection-rod $L^7$, as shown in Fig. 7, and is supported in a hanger $L^{13}$, depending from the bed C of the machine, as shown in Fig. 7.

The flanges are moved forward one by one by the feed-plunger between the forward ends of two jaws M' M', tapering from their outer to their inner ends, and located between the jaw-guides M M, which converge from their outer to their inner ends in accordance with the taper of the jaws, so that as the jaws are moved forward between the guides they will at the same time have a parallel inward movement toward each other for gripping the flanges.

For the delivery of the flanges in front of the feed-plunger L, as stated, the delivery end of the guide is passed through a transverse slot $M^2$, formed toward the forward end of the adjacent jaw-guide M, and through an alined transverse slot $M^3$, formed in the adjacent jaw M', the slot $M^3$ being enough longer than the width of the guide to permit the jaw to be moved back and forth without disturbing the same.

Each jaw is constructed, as shown in Figs. 11, 12, and 13, upon the upper corner of its inner edge with a longitudinal rabbet $M^4$, the two rabbets combining to form a passage-way for the flanges. The bottom of the said passage-way is on the same level as the bottom of the guide, as clearly shown in Fig. 12.

For moving the jaws forward each is provided at its rear end with a pin $m$, the pins of both jaws being engaged by a movable block or collar $l'$, mounted upon the rear end of the feed-plunger L in rear of the said pins. A stiff spiral spring $l^2$ is interposed between the block $L^2$ and the outer face of the said collar, while a longer but lighter spiral spring $l^3$ is interposed between the inner face of the said movable collar $l'$ and a corresponding movable collar $l^4$, located upon the forward end of the feed-plunger, which is made larger at its forward end to form a shoulder $l^5$ for the collar $l^4$ to rest against. When the slide is retracted it draws the forward end of the feed-plunger outward, so as to permit the flanges to be fed in front of the same by the guideway. When, however, the slide is moved inward, the feed-plunger will be moved correspondingly inward without the compression of either of the springs $l^2$ or $l^3$ until the movable collar $l'$, located upon the rear end of the plunger, engages with the pins $m$ $m$, mounted in the rear ends of the jaws, at which time the spring $l^2$ will be slightly compressed between the block $L^2$ and the collar $l'$, and hence the jaws moved yieldingly forward, the jaws being at the same time moved slightly inward, so as to grip the flange between their forward ends by the convergence of the jaw-guides M M. When the spring $l^2$ is compressed and the collar $l'$ moved forward, the spring $l^3$ will be slightly compressed, inasmuch as the forward collar $l^4$ is prevented from moving forward by means of the shoulder $l^5$ on the plunger. Then when the slide draws the plunger outward again the two springs recover their normal positions. The stiffer spring $l^2$ is the medium through which the jaws are yieldingly moved forward, while the lighter spring $l^3$ has its chief function in keeping the collar $l'$ in place. The jaws are then moved back preparatory to receiving another flange by means of two springs $m'$ $m'$, engaging with the pins $m$ $m$ aforesaid.

As herein shown, it is designed that the machine shall be timed, so that while the finishing grubbing-saw J is operating upon a flange held between the jaws M' M' the feed-plunger L' shall retire and permit another flange to be fed in front of it from the guideway K, after which the plunger moves forward and utilizes the flange last fed in expelling the flange last finished from the machine, the finishing grubbing-saw having been meanwhile moved out of the way.

After a flange has been delivered by the guideway in front of the feed-plunger and moved forward by the same and tightly clamped by the jaws it is operated upon as stated by the finishing grubbing-saw J, which is a trifle wider that the primary grubbing-saw D, already described. The said saw J is mounted upon an arbor J', journaled in bearings J² J², located upon the inner end of a slide J³, mounted upon the movable table H. A pulley J⁴, mounted upon the arbor J' at a point between the bearings J² J², receives a belt J⁵, corresponding to the belt D⁵ and passing over a large pulley, (not shown,) but corresponding to the pulley D⁶ and mounted on the main driving-shaft G¹⁹. The slide J³ is constructed with two elongated slots j j, receiving bolts j' j', which secure the slide to the table H, upon which it has movement within the limits of the lengths of the slots. The slide is held in any desired adjustment upon the said table by means of a screw j², secured to the slide and passing through a block j³, secured to the table. Check-nuts j⁴ j⁴, mounted upon the screw and impinging upon the opposite faces of the block j³, limit the extension of the screw through the same. Guides j⁵ j⁵, secured to the movable table H, maintain the slide J³ in the right position thereupon. We are thus enabled to adjust the finishing grubbing-saw back and forth, so as to compensate for wear or for any other purpose, and this without reference to the other saws of the machine.

We wish to state here that while the finishing grubbing-saw is not indispensable we prefer to employ it, inasmuch as by its use we secure a higher degree of accuracy in the finished flanges, for the reason that the primary grubbing-saw does its work before the flanges are cut off and while they are in the stock-strip, while on the other hand the finishing grubbing-saw operates upon the independent flanges at a time when they are firmly held between two solid jaws.

The movable table H itself is reciprocated forward and back by means of an eccentric-rod N, the forward end of which terminates in an eccentric-strap N', embracing an eccentric N², mounted upon the shaft L¹⁰, already described.

It will be clear from the foregoing description that the primary grubbing-saw, the slitting-saw, the finishing grubbing-saw, and the drill will be simultaneously operated by every movement of the movable table, so that while the primary grubbing-saw is slotting or throating the stock-strip the drill is drilling the same, and the slitting-saw cutting off a flange from the same, and the finishing grubbing-saw slightly widening and finishing the throat of a flange. Naturally the three saws will not wear uniformly, and we have provided for compensating for their wear, whatever it may be, as well as for using saws of different diameters, by mounting the arbors carrying them in slides independently adjustable upon the movable table or tool-carriage. This is an obvious advantage, because it enables the saws to be removed and filed and replaced, as may be required, and permits the machine to always be kept in that condition in which it does its best work. We have also made provision for adjusting the several saws laterally. This provision consists in providing the outer end of each saw-arbor with two nuts O and O', which are used in conjunction with the belt-pulleys carried by the arbors, the said pulleys being laterally movable on the same. Thus by loosening the pulley and adjusting the nuts of any arbor we are enabled to shift the arbor, so as to bring the saw into exactly the right position, at which time the pulley is tightened on the arbor and the nuts set up to bearing. In this way we are enabled to independently adjust the arbors of the saws to compensate for sidewise wear and keep the saws in truth. We are also enabled to adjust the saw-arbors, as may be required, for resetting the machine to produce flanges of various widths.

We would call attention to the fact that the machine requires no further attention than the feeding of the stock-strips directly to it, the character of the vise and the vise-plates thereof operating to straighten the strips, the handling of which is thus reduced to the minimum.

It is apparent that a machine constructed in accordance with our invention may be used for producing other piano-action parts than flanges, in which case the instrumentalities employed to operate upon the stock-strip would be suited to the work to be done.

It is apparent, furthermore, that the construction of the parts shown and described herein may be widely varied, and particularly the devices for driving the saws, the drill, and the movable table for adjusting the independent slides and securing them to the said table, and we would therefore have it understood that we do not limit ourselves to the exact construction herein shown and described, but hold ourselves at liberty to make such changes and alterations as fairly fall within the spirit and scope of our invention.

Having fully described our invention, what we claim as new, and desire to secure by Letters Patent, is—

1. In an automatic machine for producing piano-action parts, the combination with a stationary vise comprising a chambered body, a vise-plate yieldingly attached to the upper face thereof, and a sectional vise-plate having its respective sections yieldingly attached to the inner face thereof, the said plates clamping the upper face and inner edge of a long stock-strip fed through the vise, of a pair of friction feed-rolls arranged one above the other, the lower roll being located in the chambered vise-body, a tool-carriage, means for moving the said carriage toward and away from the vise, a grubbing-saw and a slitting-saw mounted in the said carriage, and passing between sections of the sectional vise-plate for throating the strip and cutting off short-throated sections therefrom, a drill for drilling the strip prior to the action of the slitting-saw, and connections between the table and drill, whereby the horizontal reciprocation of the table is transformed into vertical reciprocation for raising and lowering the drill which is depressed when the table moves away from the vise and raised when the table moves toward the vise, substantially as set forth.

2. In an automatic machine for producing piano-action parts, the combination with a stationary vise composed of a chambered body, a top vise-plate the outer edge of which is pivotally connected with the top of the vise-body, and an inner vise-plate, the lower edge of which is pivotally connected with the inner face of the said body, and devices for yieldingly holding the said plates against the body; of means for feeding a stock-strip through the body and between the plates which engage with it, a tool-carriage, means for moving the same toward and away from the vise, and cutting-tools mounted in the said carriage for operation upon the stock-strip, substantially as described.

3. In an automatic machine for producing piano-action parts, the combination with a vise-body, of a top vise-plate yieldingly applied to the top of the said body, and constructed with clearance-slots, of a sectional side vise-plate, the sections of which are yieldingly applied to the inner face of the said body, a feeding device for feeding a stock-strip through the vise and between the said plates, a tool-carriage movable toward and away from the vise, and cutting-tools mounted in the said carriage, and passing between the sections of the sectional side plate and into the slots of the slotted top plate, substantially as described.

4. In an automatic machine for producing piano-action parts, the combination with a stationary vise, of means for feeding a long stock-strip through the same, a grubbing-saw, a drill and a slitting-saw, a table movable toward and away from the vise, and having the grubbing and slitting saws mounted in it, operating connections between the said table and drill, whereby the horizontal reciprocation of the table is transformed into vertical reciprocation for raising and lowering the drill which is depressed when the table moves away from the vise, and raised when the table moves toward the vise, and means for rotating the drill.

5. In an automatic machine for producing piano-action parts, the combination with a stationary vise, of means for feeding a long stock-strip through the same, a grubbing-saw for throating the strip, a slitting-saw for cutting off throated sections from the strip, means for moving the said saws toward and away from the stationary vise, a stop-gage located above the vise in a plane between the planes of the saws and adapted to enter the throats formed by the grubbing-saw for controlling the feeding of the strip, and means for operating the said gage.

6. In an automatic machine for producing piano-action parts, the combination with a stationary vise, of means for feeding a stock-strip through the same, a grubbing-saw for throating the strip, a slitting-saw for cutting off the throated sections from the strip, means for moving the said saws toward and away from the vise, a stop-gage located above the vise in a plane between the vertical planes of the saws, and comprising a downwardly-extending finger adapted to enter the throats formed by the grubbing-saw, and an arm which extends over the top of the vise, and means for intermittently oscillating the said arm.

7. In an automatic machine for producing piano-action parts, the combination with a vise-body, of an upper vise-plate yieldingly applied to the top of the said body, an inner vise-plate yieldingly applied to the inner face of the said body, a friction feed-roll located in a recess formed to receive it in the vise-body, a friction feed-roll located above the vise-body and entering a recess formed in the yielding upper vise-plate and coöperating with the lower roll to feed long stock-strips through the vise-body, a grubbing-saw for throating the strip, a slitting-saw for cutting off short-throated sections from the strip, a stop-gage located between the said saws for entering the throats in the strip to control the feeding of the same, and a drill located between the stop-gage and the slitting-saw for drilling the strip prior to the action of the said slitting-saw, substantially as described.

8. In an automatic machine for producing piano-action parts, the combination with a vise, of a grubbing-saw, a drill, a slitting-saw, means for moving the saws and drill toward and away from the stock-strip held by the vise, a finishing grubbing-saw, and means for successively feeding the flanges cut from the stock-strip by the slitting-saw to the action of the finishing grubbing-saw, substantially as described.

9. In an automatic machine for producing piano-action parts, the combination with instrumentalities for producing piano-action flanges from a stock-strip, of a finishing grubbing-saw, a feed-plunger, a pair of holding-jaws, a guideway for delivering the flanges in front of the said plunger, and means for moving the finishing grubbing-saw toward and away from the said jaws, substantially as described.

10. In an automatic machine for producing piano-action parts, the combination with instrumentalities for producing piano-action flanges from a stock-strip, of a finishing grubbing-saw, a feed-plunger, means for delivering the flanges in front of the said plunger, a pair of reciprocating jaws constructed to close together and hold the flanges presented to them by the plunger, connection between the said jaws and plunger, whereby the latter yieldingly operates the former, and means for moving the finishing grubbing-saw toward and away from the said jaws, substantially as described.

11. In an automatic machine for producing piano-action flanges, the combination with a stationary vise adapted to have stock-strips fed directly into it, of a movable table, means for moving the said table toward and away from the vise, a grubbing-saw, a slitting-saw, and a finishing-saw mounted upon the said table for independent adjustment thereupon, a drill connected with the table for operation thereby as the same moves back and forth, a stop-gage adapted to enter the slots formed in the stock-strip by the grubbing-saw for gaging the feeding of the strip, and means for successively feeding the blanks cut from the stock-strip by the slitting-saw to the action of the finishing grubbing-saw, substantially as set forth.

In testimony whereof we have signed this specification in the presence of two subscribing witnesses.

WILLIAM W. SHAILER.
HENRY P. CHAPMAN.

Witnesses:
FRED. C. EARLE,
LILLIAN D. KELSEY.